US012636957B1

(12) United States Patent
Assadi et al.

(10) Patent No.: US 12,636,957 B1
(45) Date of Patent: May 26, 2026

(54) CONTACTLESS DIRECTION OF SORTATION SHUTTLES ALONG A TRACK

(71) Applicant: Amazon Technologies, Inc., Seattle, WA (US)

(72) Inventors: Michael D. Assadi, Seattle, WA (US); Sudhakar Teegavarapu, Hopkinton, MA (US); Vivek S. Narayanan, Franklin, TN (US); Ganesh Krishnamoorthy, Seattle, WA (US); Michael Alan Bray, Elkhorn, NE (US); Zechariah Ives, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 904 days.

(21) Appl. No.: 17/937,003

(22) Filed: Sep. 30, 2022

(51) Int. Cl.
| | |
|---|---|
| *B60L 13/00* | (2006.01) |
| *B60L 13/08* | (2006.01) |
| *B61B 13/12* | (2006.01) |
| *B65G 35/06* | (2006.01) |
| *B65G 54/02* | (2006.01) |
| *E01B 25/34* | (2006.01) |
| *B60L 13/03* | (2006.01) |
| *B65G 1/137* | (2006.01) |
| *H02K 41/03* | (2006.01) |

(52) U.S. Cl.
CPC ............. *B60L 13/003* (2013.01); *B60L 13/08* (2013.01); *B61B 13/12* (2013.01); *B65G 35/06* (2013.01); *B65G 54/02* (2013.01); *E01B 25/34* (2013.01); *B60L 13/03* (2013.01); *B65G 1/1375* (2013.01); *H02K 41/031* (2013.01)

(58) Field of Classification Search
CPC ................... B65G 54/02; B65G 35/06; B65G 2203/043; B60L 13/03; B60L 2200/26; B60L 13/003; B60L 15/005; B60L 13/06; B60L 13/10; B60L 13/08; H02K 41/031; E01B 25/34; B61B 13/12
USPC ......... 104/281, 130.02, 130.06, 130.07, 282, 104/290, 292
See application file for complete search history.

(56) References Cited

U.S. PATENT DOCUMENTS

| | | | | | |
|---|---|---|---|---|---|
| 3,806,782 | A | * | 4/1974 | Matsui | .................... B60L 13/03 104/282 |
| 3,845,720 | A | * | 11/1974 | Bohn | .................... B60L 13/003 104/130.02 |
| 3,874,299 | A | * | 4/1975 | Silva | .................... B60L 13/003 104/130.02 |
| 3,924,537 | A | * | 12/1975 | Matsui | .................... B60L 13/03 104/282 |

(Continued)

*Primary Examiner* — Zachary L Kuhfuss
(74) *Attorney, Agent, or Firm* — Eversheds Sutherland (US) LLP

(57) ABSTRACT

Systems and methods are disclosed for contactless direction of sortation shuttles along a track. An example system for contactless direction of sortation shuttles may include a track having a linear path, and a curved path that intersects the linear path. The system may include a shuttle with a first ferrous block and a second ferrous block, the shuttle configured to move along the track, and a first set of electromagnets disposed along a side of the curved path. Electromagnets of the first set of electromagnets may be configured to be individually energized. Energizing the first set of electromagnets may cause the shuttle to merge onto the curved path via interaction with at least one of the first ferrous block or the second ferrous block.

19 Claims, 11 Drawing Sheets

(56)          References Cited

U.S. PATENT DOCUMENTS

| 6,101,952 | A | * | 8/2000 | Thornton | ............. | B60L 13/003 |
| | | | | | | 104/130.02 |
| 12,103,402 | B2 | * | 10/2024 | Huang | ................. | B60L 15/005 |
| 2021/0039502 | A1 | | 2/2021 | Clark et al. | | |
| 2021/0300685 | A1 | * | 9/2021 | Dieges | .................. | B65G 47/74 |

* cited by examiner

CONTACTLESS DIRECTION OF SORTATION SHUTTLES ALONG A TRACK

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

Figure 1:
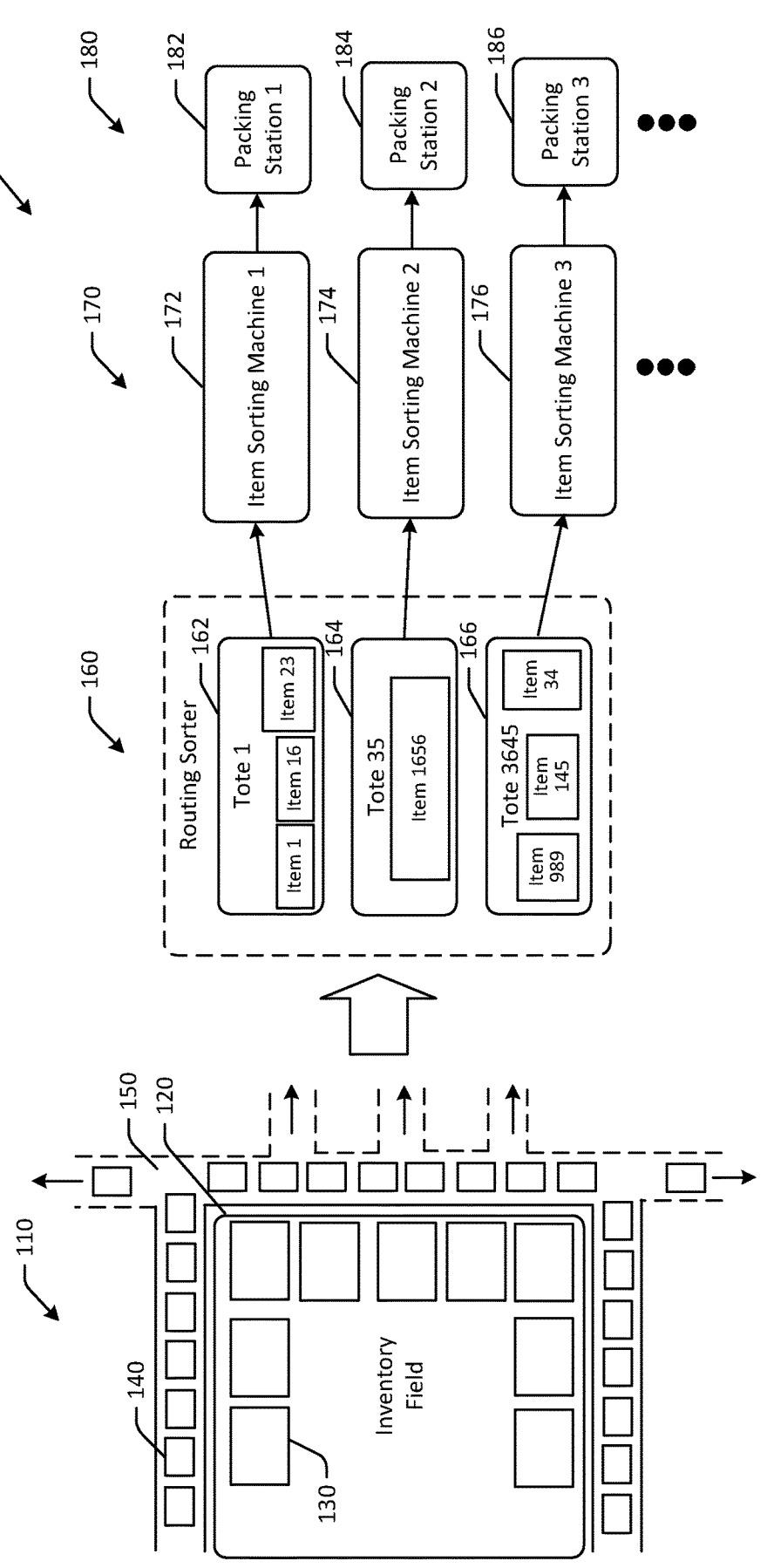
FIG. 1 is a hybrid schematic illustration of an example use case for contactless direction of sortation shuttles along a track in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, a container of items may be loaded onto a shuttle, and the shuttle may transport the container from an inventory field to a sortation system or other location. Shuttles may be used to transport containers and/or one or more items from a first location to a second location.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle.

Container shuttles may be in continuous operation and may move at relatively high speeds, such as speeds of three meters per second or more. As a result, container shuttles may require scheduled or unscheduled maintenance from time to time. For example, container shuttles may require preventative maintenance at scheduled intervals, such as calibration of one or more components, or may require unscheduled maintenance in the event of a breakdown, etc. In instances where a container shuttle breaks down or experiences a malfunction that causes the shuttle to be unable to move, backups and traffic jams may occur due to the serial nature of shuttle rail tracks. Moreover, shuttles may move along tracks that have intersections allowing the shuttle to change directions, such as to make left hand turns, right hand turns, go forward along a linear path, etc.

Accordingly, for various reasons, including maintenance, sortation shuttles may be directed along a track in a specific direction. Use of mechanical components to direct shuttles or effect changes to shuttle direction may be problematic due to wear, failure, and durability issues over repeated cycles. Such issues may cause downtime and increase costs of operation due to maintenance and repair.

Embodiments of the disclosure provide contactless shuttle directing systems that allow for management and execution of changes to shuttle direction without physically contacting the shuttle, thereby providing a repeatable and scalable solution without moving parts. In some embodiments, the shuttle does not have to be physically contacted to perform a change of direction, and the system may not include any moving parts. As a result, durability, scalability, and reliability of the system are improved. Embodiments include electromagnets disposed along one or more sides of the track along which the shuttle moves, where electromagnets can be selectively energized so as to pull the shuttle in a certain direction, such as from a linear path onto a branched path, or to bypass a branched path and continue along a linear path, and so forth. Embodiments may therefore be contactless in that shuttle direction can be modified via the use of electromagnets that interact with ferrous blocks coupled to side surfaces of the shuttle to pull and/or direct the shuttle in a certain direction.

As a result of the improve functionality provided by the contactless shuttle directing systems and methods described herein, flexibility of the processing of items at the fulfillment center may be increased, such as by providing the ability to direct shuttles without any mechanical components. Some embodiments include optimized process flows for processing of orders at fulfillment centers, as well as process flows or methods to increase speed of consolidating products in a multi-item order as a result of improved speed in transportation of items and/or containers. As a result, throughput of fulfillment centers may be improved, and/or logistics of fulfillment center operations may be less complicated.

Referring to FIG. 1, an example use case 100 for contactless direction of sortation shuttles along a track is depicted in accordance with one or more embodiments of the disclosure. Although discussed in the context of online orders, other embodiments may be directed to any suitable use case where containers or items are transported, such as instances where objects are picked from inventory, placed into containers, containers are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include rails that may be used to guide shuttles from one location to another. The rails may be used with automated reorientation systems for shuttles described herein.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of containers is used and/or shuttles are used to transport items or containers between systems, systems as described herein may be used for contactless direction of sortation shuttles along a track.

Embodiments of the disclosure include systems and methods for contactless direction of sortation shuttles along a track. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
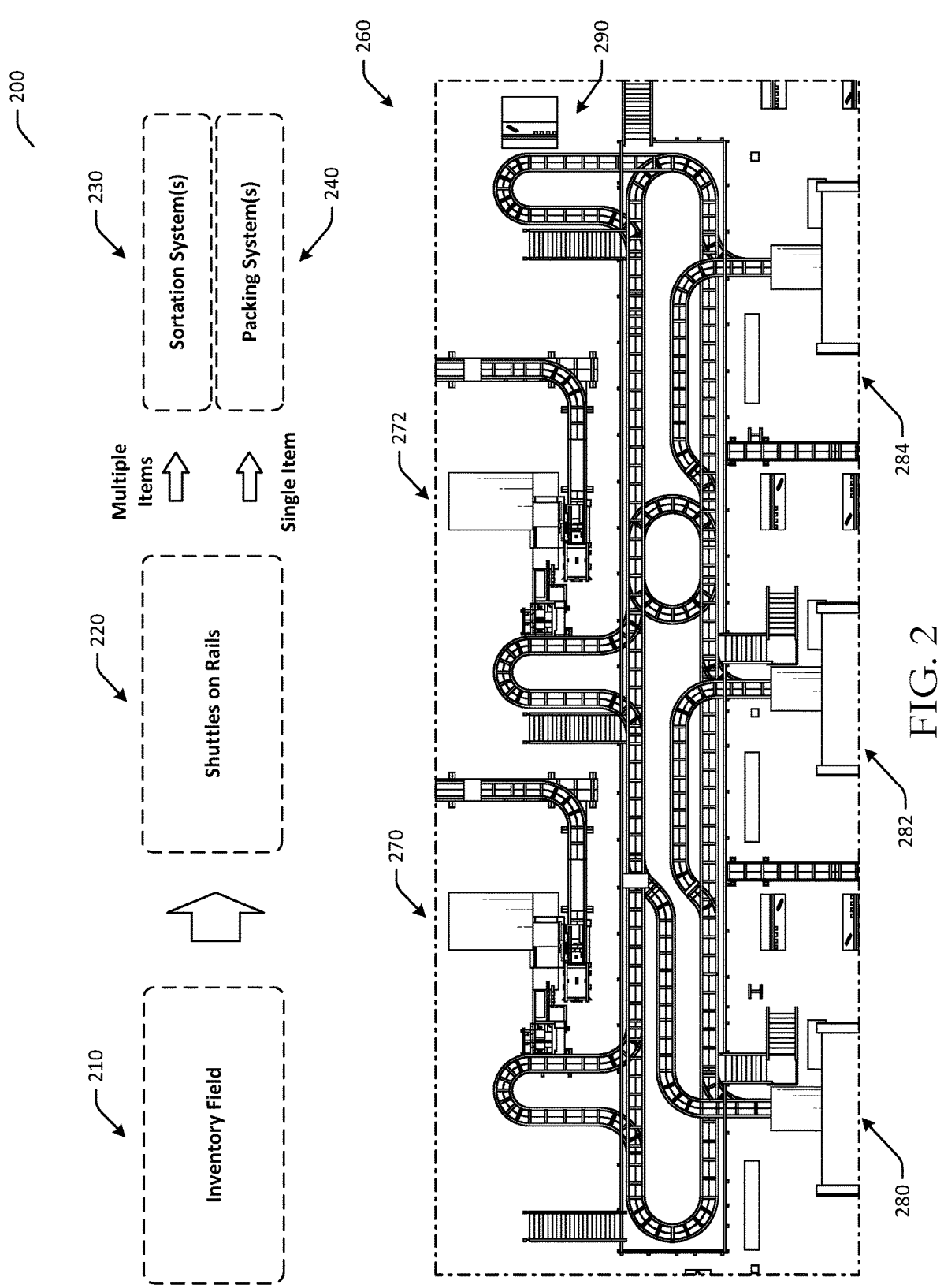
FIG. 2 is a schematic illustration of an example use case and facility layout for contactless direction of sortation shuttles along a track in accordance with one or more embodiments of the disclosure.

FIG. 2 is a schematic illustration of an example use case 200 and facility layout for contactless direction of sortation shuttles along a track in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using robots, vehicles, or a combination thereof.

The picked products may be placed into one or more containers and the containers may be transported using one or more shuttles, such as one or more shuttles on rails 220. The shuttles on rails 220 may include container shuttles that are configured to transport items and/or containers from one location to another via rails. The shuttles on rails 220 may transport containers from the inventory field 210 to one or more downstream processes, such as a sortation system 230, or a packing system 240. For example, the sortation system

230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a network of rails that may be used by shuttles to transport containers from one location to another. The network of rails may include locations at which a shuttle can be directed to a straight path or to a loop, turn, oval, circle, and/or other geometries that involve a change in direction of a shuttle on the rails. Such changes in direction may be implemented using the systems described herein. Shuttles can be routed to a maintenance area 290 connected to the rail system 260 using the systems described herein. The rail system 260 may include rails that link various systems, such as sortation systems, to each other and/or to other systems, such as container handling systems, manual induction systems 290, and so forth. For example, the rail system 260 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motors or other drive components. Some drive components may provide a drive force via electromagnetism. As a result, one or more electromagnets may be disposed along the network of rails. Shuttles may optionally include a conveyor belt that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off of the conveyor belt. The shuttles may include an on-board drive motor configured to move the conveyor belt in a forward direction and/or a reverse direction. The shuttles may include a magnet disposed on a lower surface of the shuttle. The magnet may be used to propel and/or secure the shuttle. For example, the magnet may prevent the shuttle from moving while the vehicle is in motion and the linear drive motor is engaged. To onboard or offload containers, the linear drive motor of the shuttle or other component may be used in conjunction with the magnet to impart motion. The contactless shuttle directing systems described herein may be used to guide the shuttles through intersections, merge points, and other areas along the rail system 260.

Figure 3:
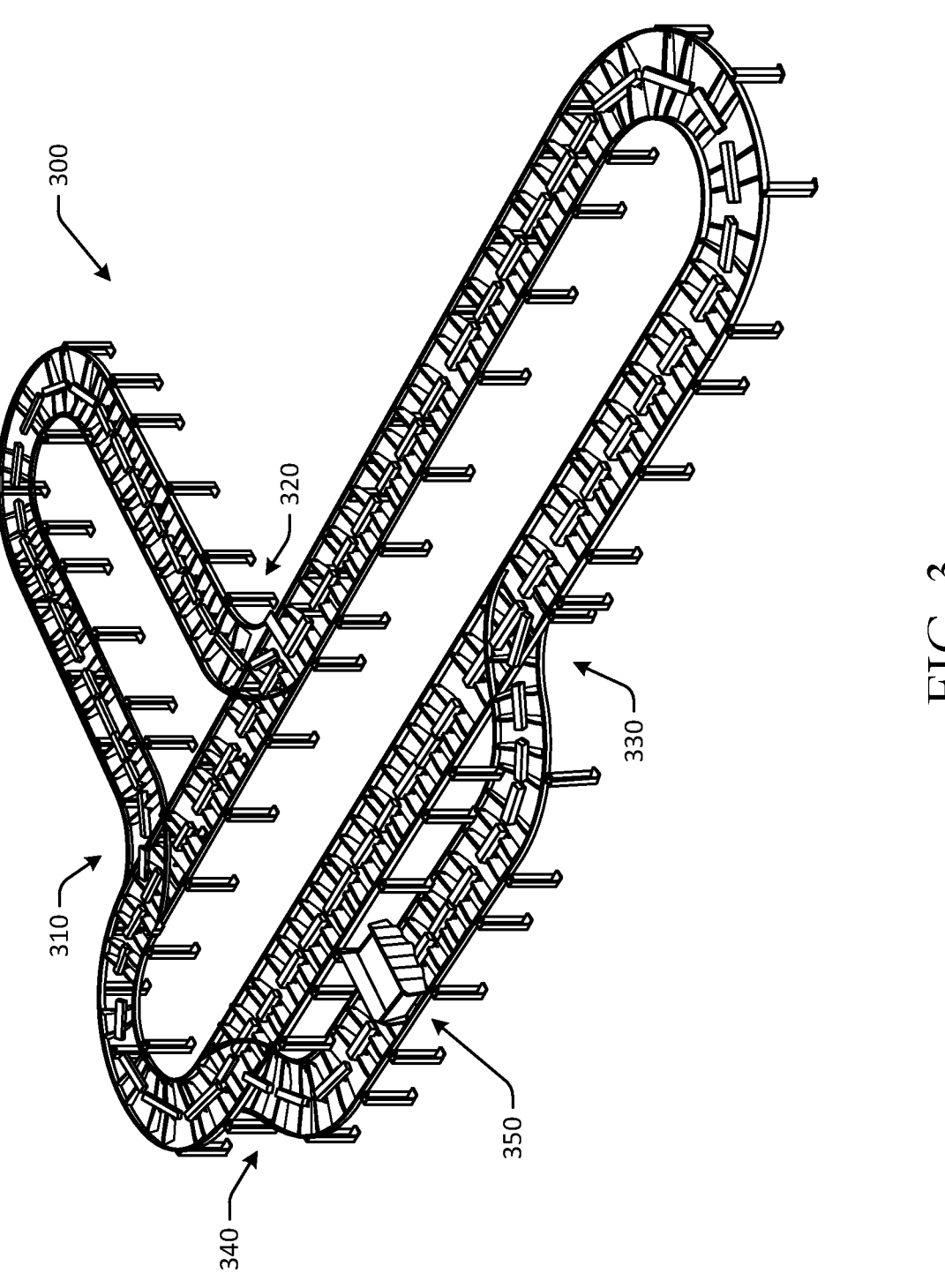
FIG. 3 is a schematic illustration of a perspective view of a shuttle rail system in accordance with one or more embodiments of the disclosure.

FIG. 3 is a schematic illustration of a perspective view of a shuttle rail system 300 in accordance with one or more embodiments of the disclosure. Other embodiments may include additional or fewer components. The illustration of FIG. 3 is not to scale, and may not be illustrated to scale with respect to other figures. The system illustrated in FIG. 3 may be used with the contactless shuttle directing systems discussed with respect to FIGS. 1-2, and/or may be used with any of the systems described herein.

The shuttle rail system 300 may be configured to provide continuous rail for switching the direction of a shuttle 350 in an electromagnetically propelled shuttle-on-rail arrangement. Shuttle-on-rail arrangements may be used in many systems, such as sortation systems, pick systems, delivery systems, etc. The shuttle rail system 300 may include the contactless switching mechanisms described herein to allow the shuttle to be directed to alternate path. Shuttle-rail arrangements that are based on electromagnetic propulsion, such as linear drive motors, may have sets of electromagnets arranged along the direction of the rails. Shuttles may also have a magnet, such as a permanent magnet, coupled to a lower side of the shuttle. The electromagnet and the permanent magnet may have to be separated by a very narrow gap for optimal performance.

The shuttle rail system 300 may include a first branched path 310, where if shuttles were moving along the shuttle rail system 300 in a clockwise direction, the shuttle could move in either a straight direction along the oval path of the shuttle rail system 300, or may make a left-handed curve onto a separate path of the shuttle rail system 300. Similarly, a second branched path 320 may allow for merging of shuttles that took a left curve at the first branched path 310 to merge back onto the oval path of the shuttle rail system 300. Any number of curved path and straight path intersections may be included in the shuttle rail system 300. For example, the shuttle rail system 300 may include a third branched path 330 and a fourth branched path 340. The shuttle rail system 300 may form a closed loop track in some embodiments.

A maintenance area may be connected to the shuttle rail system 300 and may be accessible via the shuttle rail system 300. For example, the shuttle 350 moving along the shuttle rail system 300 may direct itself autonomously to the maintenance area by following a branched path, where the branched path may provide ingress and egress to a main path of the shuttle rail system 300.

Figure 4:
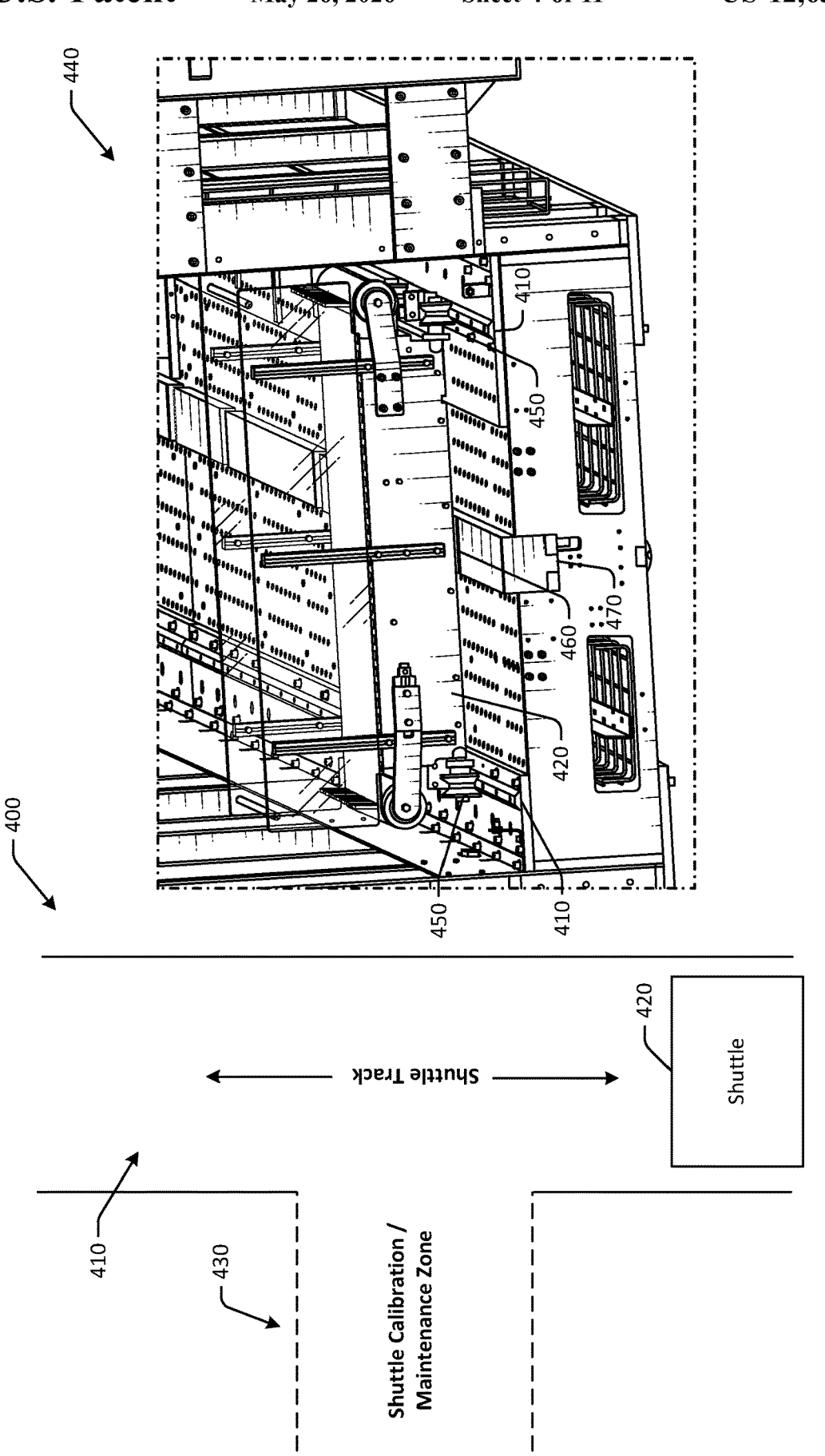
FIG. 4 is a schematic illustration of various views of portions of a shuttle rail system in accordance with one or more example embodiments of the disclosure.

FIG. 4 is a schematic illustration of various views of portions of a shuttle rail system 400 in accordance with one or more example embodiments of the disclosure. Other embodiments may include additional or fewer components. The illustration of FIG. 4 is not to scale, and may not be illustrated to scale with respect to other figures. The system illustrated in FIG. 4 may include the same shuttle and shuttle rail system discussed with respect to FIGS. 1-3.

FIG. 4 depicts a portion of the shuttle rail system 400 in a top schematic view. The shuttle rail system 400 may include one or more sets of rails 410 on which shuttles 420 may ride. The rails 410 may guide shuttles 420 to various locations. Each set of rails 410 may include two rails, so as to support two sides of a shuttle 420 on the rails. The shuttle rail system 400 may include a number of supports disposed between the two rails of a set of rails 410. A number of electromagnets 470 may optionally be disposed along the rails at various intervals. The electromagnets 470 may be configured to propel shuttles along the respective sets of rails.

The shuttle rail system may include a shuttle calibration/maintenance zone 430 that is connected to the shuttle rail system 400 and is accessible via the tracks. For example, a shuttle may seamlessly move from the set of rails 410 to the shuttle calibration/maintenance zone 430. The shuttle calibration/maintenance zone 430 may be a section of shuttle track that leads to a maintenance area at which one or more robotic manipulators are disposed. The shuttle calibration/ maintenance zone 430 may be accessible as a branched path, a loop, and/or a straight track that can be used for shuttles to move back-and-forth along.

A perspective view 440 in FIG. 4 depicts the shuttle 420 engaged with the shuttle rail system 400. The shuttle 420 may include wheels 450 that engage the rails 410. Some embodiments may include four wheels 450, while other embodiments may include different numbers of wheels. Any suitable number and size of wheels may be used to engage with the rails 410.

The shuttle 420 may include a permanent magnet 460 disposed underneath the shuttle 420. The permanent magnet 460 may interact with the electromagnets 470 to electromagnetically propel the shuttle 420. The electromagnets 460 may therefore be a linear synchronous motor in some embodiments.

Although the shuttle 420 is depicted as traveling in a sideways configuration with respect to the shuttle rail system 400 (e.g., a payload on the shuttle 420 may be moving sideways with respect to the shuttle rail system 400, etc.), in other embodiments, the shuttle 420 may be oriented differently.

The shuttle rail system 400 may therefore include the set of rails 410 that form a track having a central axis. The set of rails 410 may include a first rail segment on a first side of the central axis and a second rail segment on a second side of the central axis. The shuttle rail system 400 may include the set of electromagnets 470 disposed along the central axis of the track. The shuttle rail system 400 may be used with the shuttles 420, where the shuttles 420 are configured to transport one or more items or containers from a first location to a second location using the set of rails 410. The shuttle may include a first pair of wheels 450 disposed at a front end of the shuttle 420, and a second pair of wheels 450 disposed at a rear end of the shuttle 420. In some embodiments, the shuttle 420 may include a conveyor assembly having a central axis that is transverse to the central axis of the track, such as in the embodiment depicted in FIG. 4. The shuttle 420 may include the permanent magnet 460 coupled to a lower surface of the shuttle 420. The permanent magnet 460 may be configured to engage with the set of electromagnets 470 to propel the shuttle 420.

Figure 5A:
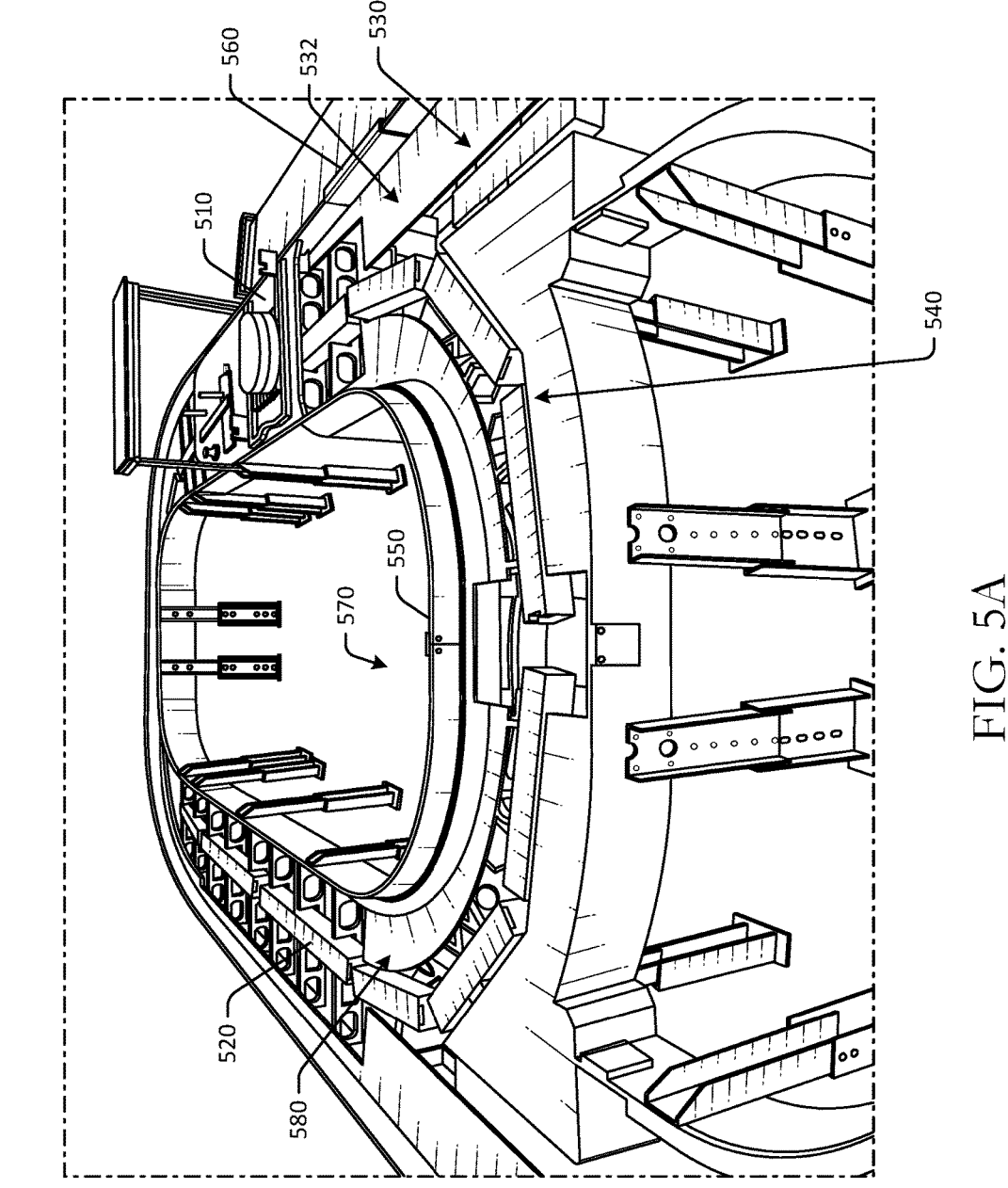
FIGS. 5A-5B are schematic illustrations of a shuttle rail system configured for contactless direction of sortation shuttles in accordance with one or more embodiments of the disclosure.
Figure 5B:
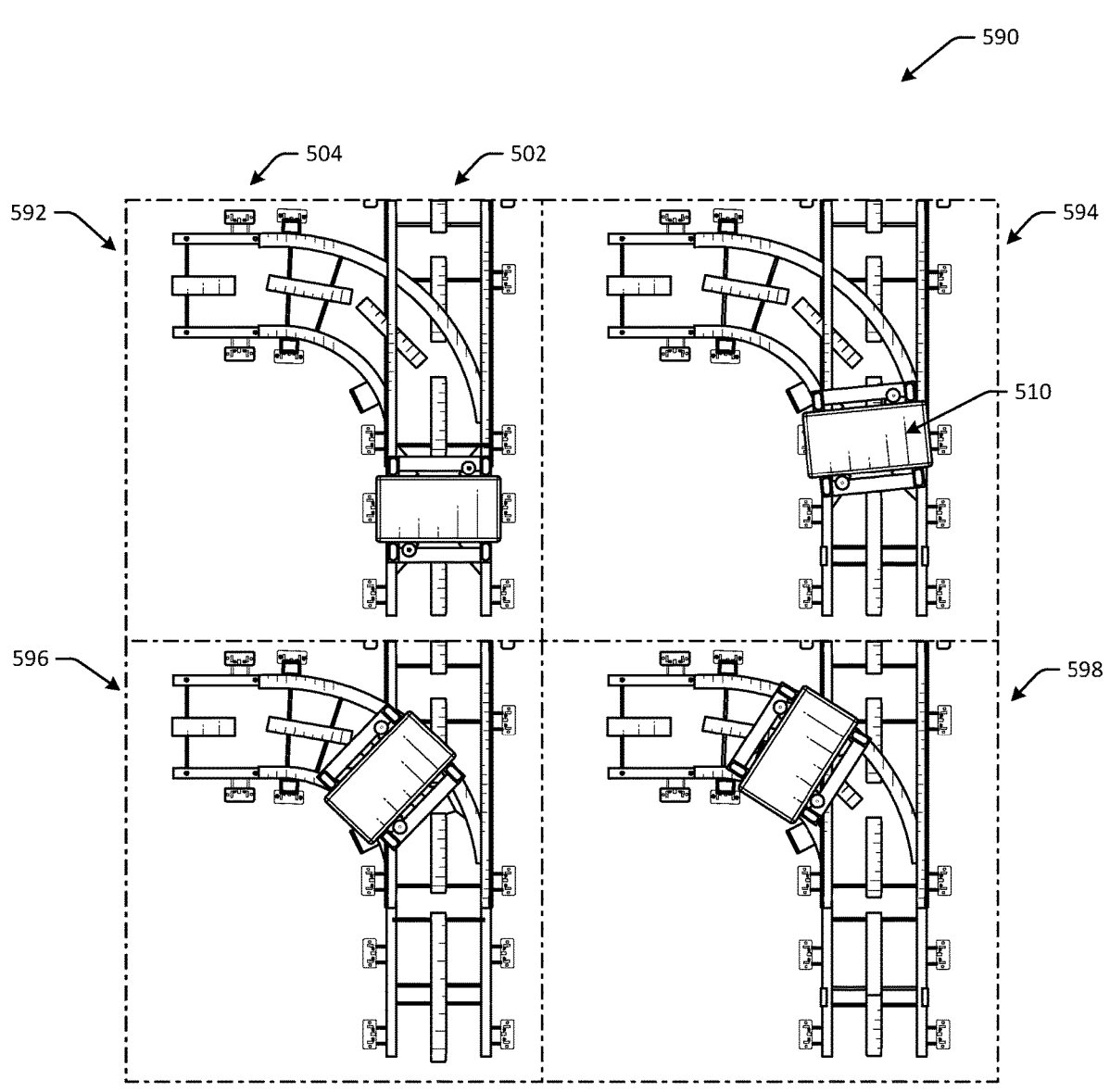

FIGS. 5A-5B are schematic illustrations of a shuttle rail system 500 configured for contactless direction of sortation shuttles in accordance with one or more embodiments of the disclosure. Other embodiments may include additional or fewer components. The illustrations of FIGS. 5A-5B are not to scale, and may not be illustrated to scale with respect to other figures. The contactless shuttle directing system illustrated in FIGS. 5A-5B may be the same contactless shuttle directing systems discussed with respect to FIGS. 1-4.

In FIG. 5A, the shuttle rail system 500 may be configured for contactless direction of sortation shuttles, and may not include active or driven shuttle direction components, such as switches. The shuttle rail system 500 may include one or more paths, such as a linear path 530, a curved or branched path 540, and so forth. The branched path 540 may intersect the linear path 530 at one end 532, as depicted in the example of FIG. 5A, and may merge with another linear path at an opposite end 580 (the opposite may be true depending on a direction of travel of the shuttle, and the curved path may optionally intersection one or more linear paths). A shuttle 510 may be propelled along the track of the shuttle rail system 500 via interaction between a permanent magnet coupled to a lower portion of the shuttle 510 and one or more track electromagnets 520 disposed along the track.

To guide shuttle movement and/or direct the shuttle 510 along a certain route or path, the shuttle rail system 500 may include one or more electromagnets disposed along sides of the track. For example, a first set of electromagnets 550 may be disposed along the branched path 540 and may be configured to pull or guide the shuttle 510 from the linear path 530 onto the branched path 540. Accordingly, if the system desires to guide the shuttle 510 onto the branched path 540 instead of the linear path 530, the first set of electromagnets 550 may be energized. The energized electromagnets may impart an attractive force on one or more ferrous blocks coupled to a side of the shuttle 510, and may cause the shuttle 510 to be routed onto the branched path 540. As discussed with respect to FIGS. 6A-6C, the electromagnets may be energized at the same time or substantially the same time (e.g., within milliseconds of each other, etc.), or may be energized sequentially for reduced power consumption. One or more heatsinks and/or cooling assemblies 570 may be disposed adjacent to the first set of electromagnets for temperature management. In one embodiment, the electromagnets may individually be energized using 7.5 amps.

If, instead of directing the shuttle 510 along the branched path 540, the shuttle 510 is to continue down the linear path 530, the shuttle rail system 500 may include a second set of electromagnets 560 disposed along a side of the track adjacent to the linear path 530, where the second set of electromagnets 560 may be energized to pull or direct the shuttle 510 down the linear path 530 instead of moving onto the branched path 540 at the intersection.

In FIG. 5B, an example sequence 590 for contactless shuttle direction for a left-hand turn is depicted. At a first instance 592, the shuttle 510 may be moving along linear path 502, and may be directed onto curved path 504 via a contactless shuttle directing system. At the first instance 592, the shuttle 510 may be moving at a speed of 3 meters per second and the electromagnets along the curved path 504 may not be energized.

As the shuttle 510 approaches the intersection at a second instance 594, the shuttle 510 may be biased toward the curved path 504 via activation or energization of the electromagnets. The shuttle speed may remain at 3 meters per second with a lateral force of 156 Newtons, a centripetal force of 45 Newtons, and a total magnetic force of 251 Newtons.

As the shuttle 510 continues along the curved path 504 at a third instance 596, the shuttle speed may remain at 3 meters per second with a steering angle of 8 degrees and a steering force of 91 Newtons, A centripetal force may increase to about 495 Newtons, and a total magnetic force may be about 586 Newtons.

As the shuttle 510 is held along the curved path 504 and prepares to move in a linear direction at a fourth instance 598, the shuttle speed may remain at 3 meters per second with a centripetal force steady at about 495 Newtons, and a total magnetic force of about 495 Newtons. In this manner, throughput of the system may be improved (or may not be negatively impacted), as shuttle speed remains constant throughout the curve or turn.

Accordingly, embodiments may include a track having a linear path, and a curved path that intersects the linear path. The track may be devoid of mechanical switching components, at least at the intersection, to direct the shuttle along the linear path or the curved path. The system may include a shuttle having a first ferrous block and a second ferrous block, the shuttle configured to move along the track (e.g., along both the linear path and the curved path, etc.). The system may include a set of electromagnets disposed along the track, where the shuttle has a permanent magnet, and the shuttle is propelled along the track via interaction between the permanent magnet and the set of electromagnets. In some embodiments, the shuttle moves in one direction along the track, whereas in other embodiments, the shuttle may move back and forth along the track.

The system may include a first set of electromagnets disposed along a side of the curved path, where electromagnets of the first set of electromagnets are configured to be individually energized. Energizing the first set of electromagnets may cause the shuttle to merge onto the curved path via interaction with at least one of the first ferrous block or the second ferrous block. The system may include a second set of electromagnets disposed along a side of the linear path, where electromagnets of the second set of electromagnets can be individually energized. Energizing the second set of electromagnets may cause the shuttle to bypass the curved path via interaction with at least one of the first ferrous block or the second ferrous block.

Figure 6A:
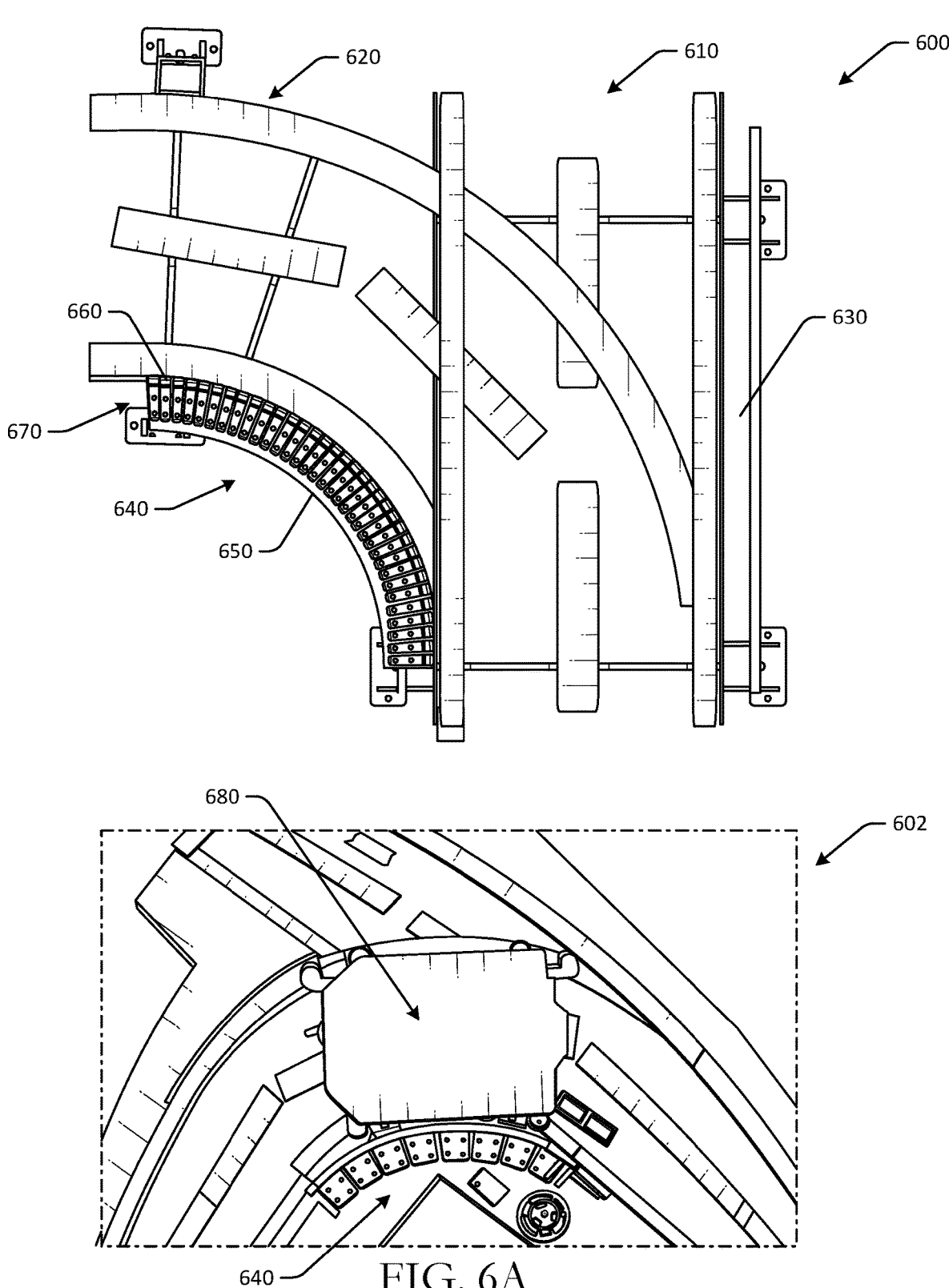
FIGS. 6A-6C are schematic illustrations of components of a contactless shuttle directing system in various views in accordance with one or more embodiments of the disclosure.
Figure 6B:
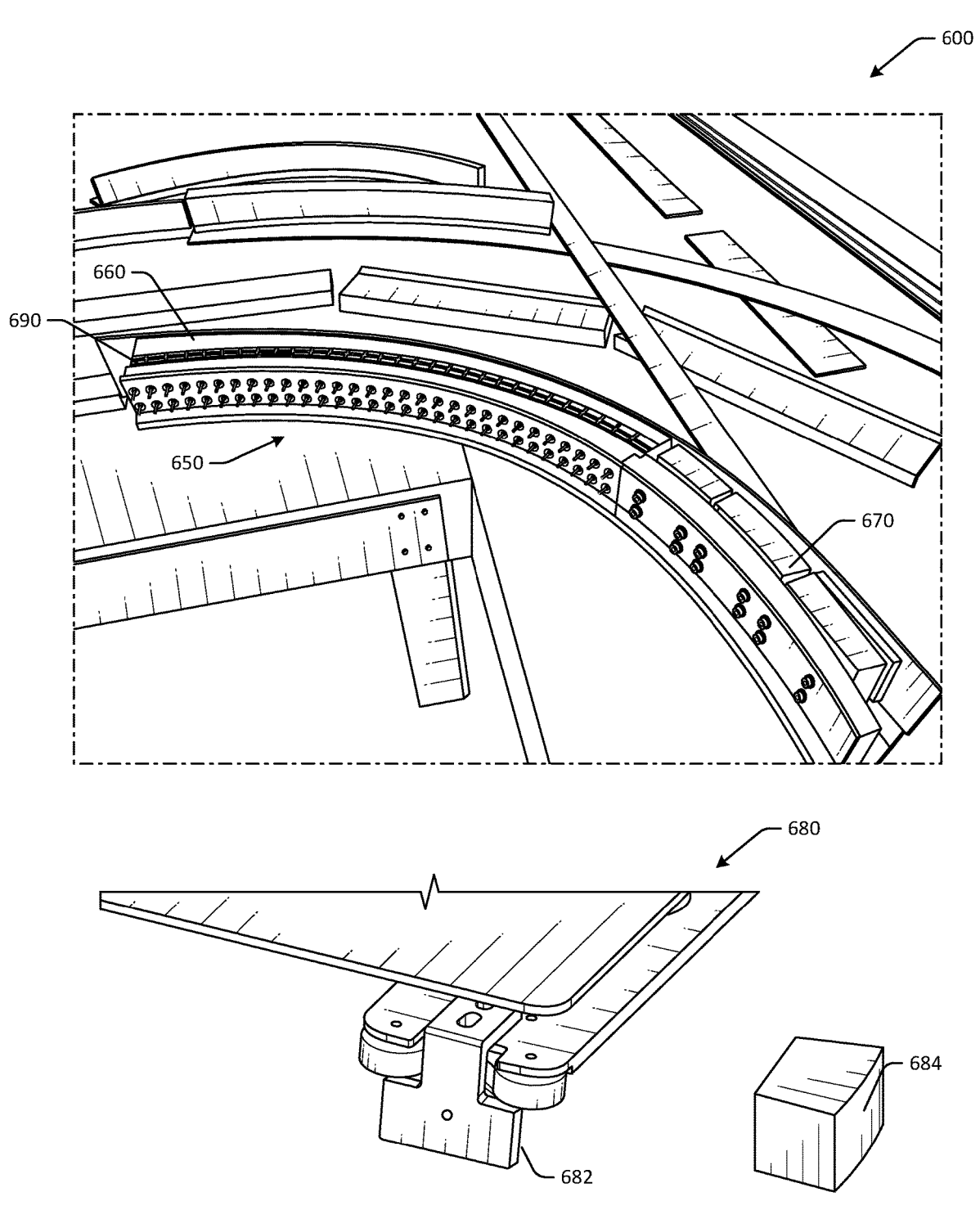
Figure 6C:
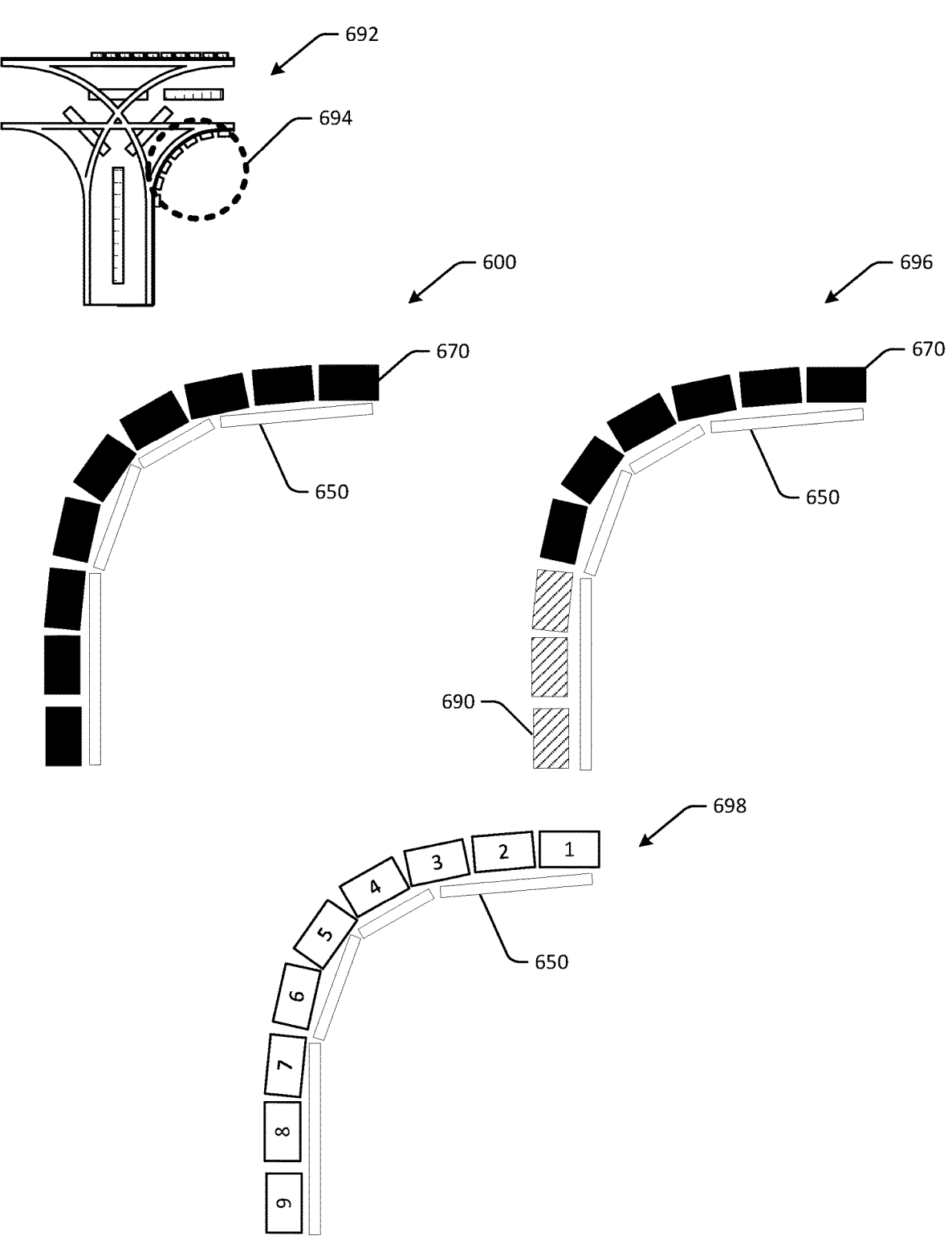

FIGS. 6A-6C are schematic illustrations of components of a contactless shuttle directing system 600 in various views in accordance with one or more embodiments of the disclosure. Other embodiments may include additional or fewer components. The illustrations of FIGS. 6A-6C are not to scale, and may not be illustrated to scale with respect to other figures. The contactless shuttle directing system illustrated in FIGS. 6A-6C may be the same systems discussed with respect to FIGS. 1-5B.

In FIG. 6A, a track intersection of the contactless shuttle directing system 600 where a linear or straight path 610 and a curved path 620 intersect is depicted in top view. The intersection may be a merge point or a turning point depending on a direction of travel of a shuttle 680. As depicted in view 602, the shuttle 680 may be configured to move along the linear path 610 and the curved path 620. To direct the shuttle 680, the contactless shuttle directing system 600 may include a first set of electromagnets 630 disposed along a side of the linear path 610, where energizing of the first set of electromagnets 630 causes the shuttle 680 to move along the linear path 610 and bypass the curved path 620. The first set of electromagnets 630 may include one or more vertically arranged electromagnets disposed along a side of the track.

The contactless shuttle directing system 600 may include a second set of electromagnets 670 disposed along a side of the curved path 620. Energizing of the second set of electromagnets 670 causes the shuttle 680 to move along the curved path 620 and bypass the linear path 610. The second set of electromagnets 670 may include one or more vertically arranged electromagnets disposed along a side of the track. To provide a smooth surface along which the shuttle 680 may move, and to avoid the possibility of snags or other obstructions, a first curved plate 660, such as a curved metal or aluminum plate, may be coupled to the second set of electromagnets 670 and/or disposed between the second set of electromagnets 670 and the shuttle 680. Similarly, an optional second curved plate 650, such as a curved metal or aluminum plate, may be coupled to the second set of electromagnets 670 and/or disposed on an opposite side of the electromagnets than the first curved plate 660. One or more active and/or passive cooling devices 640, such as heatsinks, fans, and the like, may be disposed adjacent to the second curved plate 650 to regulate electromagnet temperature.

The portion of the contactless shuttle directing system 600 with the second set of electromagnets 670 is depicted in perspective detail view in FIG. 6B, with the respective curved plates 650, 660 and the cooling devices 640 depicted adjacent to the electromagnets. As illustrated, the electromagnets may be vertically oriented and arranged adjacent to the track at a vertically elevated position relative to electromagnets disposed along the track (e.g., the electromagnets used to propel the shuttle along the track, etc.).

The first set of electromagnets 670 and the second set of electromagnets 630 may interact with ferrous blocks 682, such as iron blocks, disposed at one or more sides of the shuttle 680. For example, the shuttle 680 may have a first pair of ferrous blocks disposed adjacent to shuttle wheels on one side of the shuttle 680, and a second pair of ferrous blocks disposed adjacent to shuttle wheels on the other side of the shuttle 680, so as to allow the shuttle to be pulled in both right-hand and left-hand directions.

In some embodiments, the ferrous blocks 682 may have curved outward faces 684, which may increase a strength of interaction between the ferrous blocks and the electromagnets by reducing a distance of separation as the shuttle 680 moves along the track.

Accordingly, the system may include a cover plate or the first curved plate 660 disposed on a first side of the second set of electromagnets 670, the cover plate configured to separate the second set of electromagnets 670 from the shuttle 680, and a curved steel plate, such as the second curved plate 650, disposed on a second side of the second set of electromagnets 670. One or more heatsinks and/or active or passive cooling devices 640 may be disposed adjacent to the curved steel plates.

In FIG. 6C, a three-way junction 692 of the contactless shuttle directing system 600 is depicted, with a detail view 694 of the curved path. A number of configurations may be used to optimize performance and/or reduce cost of operation. For example, in one embodiment 600 as discussed with respect to FIG. 6A, the second set of electromagnets 670 may extend about a majority of the length of the curved path, and curved plates 650, 660 may be disposed on either or both sides of the second set of electromagnets 670.

In a second embodiment 696, instead of electromagnets extending about a majority of the length of the curved path, electromagnets 670 may be disposed at a beginning of the curved path, and a number of vertically arranged permanent magnets 690 may be disposed at a middle or end of the curved path. If the curved plate(s) are steel plates, the permanent magnets 690 may be arranged with alternating north/south polarities, whereas in other embodiments, the permanent magnets 690 may be arranged with the same polarity orientation. Such configurations may reduce system and operational costs due to reduced electromagnets and electricity consumption, while still providing the same contactless direction of shuttles.

In some embodiments, to reduce power consumption, electromagnets may be energized sequentially instead of all at a same time. For example, a sequence 698 may have electromagnets energized in a direction of a turn, where 1-9 depict an order of energizing in the example of FIG. 6C. In some embodiments, more than one electromagnet, but not all, may be energized at the same time, and some electromagnets may be de-energized after the shuttle passes the respective electromagnet.

To energize electromagnets, in some embodiments pulse width modulation control may be implemented. For example, performance of the electromagnetic coils may be improved as a result of providing power via pulse width modulation, which may result in increased force (magnetic flux) and decreased operating temperatures. Pulse width modulation may be used instead of DC power, which may cause coil temperature to increase and may output limited force. With pulse width modulation, the holding force can be increased for a limited duration and the shuttles may be subject to the increase of force because the modulation occurs at a high rate (e.g., 22,000 Hz, etc.). Due to the current and voltage being increased for short pulses, the operating temperature is reduced in conjunction with the duty cycle.

Accordingly, in one embodiment, a first number of electromagnets may be disposed at a first end of the curved path, and a set of permanent magnets may be disposed adjacent to the electromagnets, the set of permanent magnets disposed at a second end of the curved path. The set of permanent magnets may optionally be disposed in an alternating polarity arrangement. In some embodiments, electromagnets can be individually energized in a sequential order, and individual electromagnets can be de-energized after an adjacent electromagnet is energized and/or after a shuttle passes the electromagnet. In other embodiments, each electromagnet can be energized at a substantially same time (e.g., within milliseconds of each other, etc.).

Figure 7:
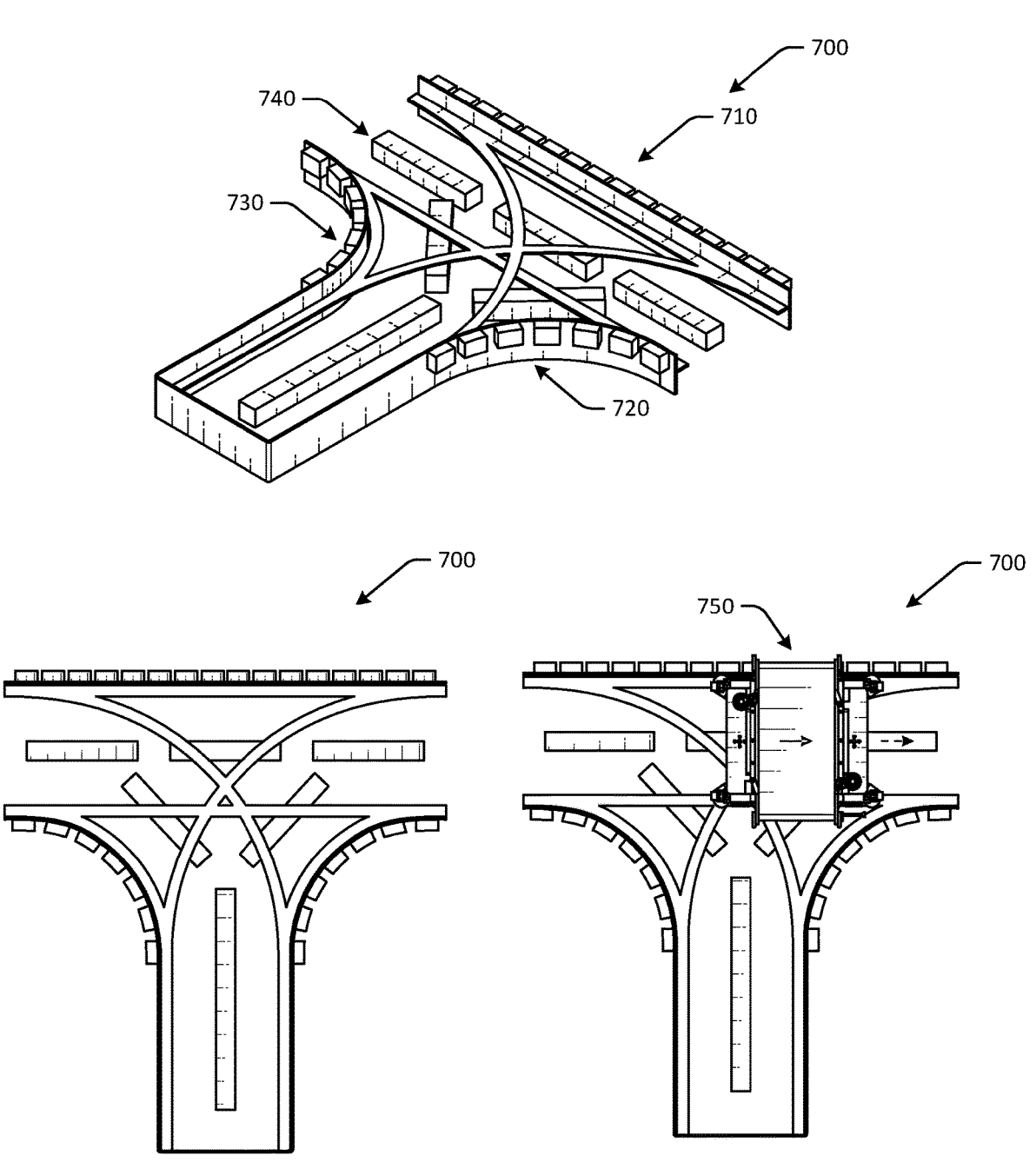
FIG. 7 is a schematic illustration of a contactless shuttle directing system in accordance with one or more embodiments of the disclosure.

FIG. 7 is a schematic illustration of an automated shuttle directing system 700 in accordance with one or more embodiments of the disclosure. Other embodiments may include additional or fewer components. The illustrations of FIG. 7 are not to scale, and may not be illustrated to scale with respect to other figures. The automated shuttle directing system illustrated in FIG. 7 may be different from the systems discussed with respect to FIGS. 1-6C.

In FIG. 7, a three-way intersection is depicted, where a shuttle may follow a linear path, execute a left-hand turn, and execute a right hand turn. The automated shuttle directing system 700 may use electromagnets or linear motors to guide shuttle movement and manage shuttle orientation when moving along a track 710. The track 710 may include a linear path and a branched path, as depicted in FIG. 7. The automated shuttle directing system 700 may include linear motors 740 to propel a shuttle 750 along the track.

The automated shuttle directing system 700 may include a first set of electromagnets 710 disposed along a side of the linear path, a second set of electromagnets 730 disposed along a first side of the branched path, and a third set of electromagnets 720 disposed along a second side of the branched path. The shuttle 750 may have one or more permanent magnets configured to interact with the first set of electromagnets 710, the second set of electromagnets 730, and the third set of electromagnets 720. For example, the shuttle 750 may have a first permanent magnet disposed along a lower surface to interact with the linear motors 740, a second permanent magnet disposed along a left-hand side surface to interact with the first set of electromagnets 710 and the third set of electromagnets 720, and a third permanent magnet disposed along a right-hand side surface to interact with the second set of electromagnets 730. In this manner, shuttle orientation can be managed by selective energizing of the different sets of electromagnets.

For example, in FIG. 7, for the shuttle 750 to continue moving along the linear path, the first set of electromagnets 710 may be energized (while the second set of electromagnets 730 and the third set of electromagnets 720 are not energized) while the linear motors 740 propel the shuttle 750, such that the shuttle 750 bypasses the branched path and continues along the linear path. For the shuttle 750 to exit the linear path and enter the branched path, the second set of electromagnets 730 may be energized (while the first set of electromagnets 710 and the third set of electromagnets 720 are not energized) while the linear motors 740 propel the shuttle 750, such that the shuttle 750 is pulled onto the branched path and continues along the branched path. For the shuttle 750 to return to the linear path from the branched path, the third set of electromagnets 720 may be energized (while the first set of electromagnets 710 and the second set of electromagnets 730 are not energized) while the linear motors 740 propel the shuttle 750, such that the shuttle 750 is pulled onto the linear path and continues along the linear path. In this manner, the shuttle direction is managed and executed without contact. Moreover, shuttle orientation may be reversed by selective activation of the different sets of electromagnets. Accordingly, in some embodiments, the shuttle 750 leaves the linear path and reenters the linear path having a reversed orientation.

Some embodiments may include a controller configured to cause the first set of electromagnets 710 to be energized to guide the shuttle 750 along the linear path, cause the second set of electromagnets 730 to be energized to guide the shuttle 750 from the linear path to the branched path, and cause the third set of electromagnets 720 to be energized to guide the shuttle 750 from the branched path to the linear path. The shuttle 750 may include one or more permanent magnets, such as a first permanent magnet disposed under the shuttle. The shuttle 750 may include a second permanent magnet on a first side of the shuttle, and a third permanent magnet on a second side of the shuttle. In other embodiments, instead of permanent magnets on one or more sides of the shuttle 750, the shuttle 750 may include one or more ferrous blocks, such as metal blocks, disposed on one or more sides of the shuttle 750. For example, a first ferrous block may be disposed on a first side of the shuttle 750, and a second ferrous block may be disposed on a second side of the shuttle 750. Any number of ferrous blocks may be included.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
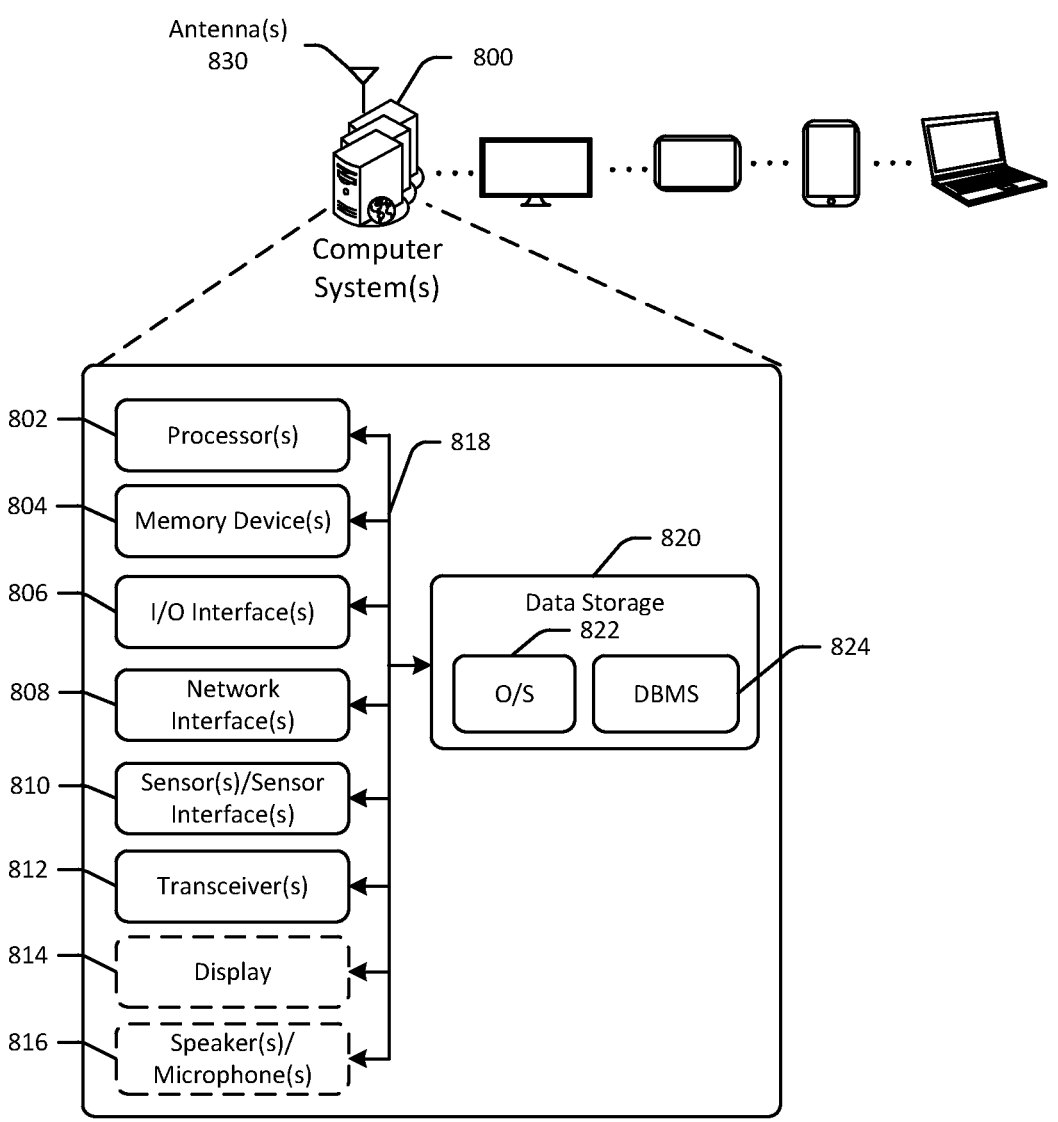
FIG. 8 schematically illustrates an example architecture of a computer system associated with a shuttle rail system in accordance with one or more embodiments of the disclosure.

FIG. 8 is a schematic block diagram of one or more illustrative computer system(s) 800 associated with a shuttle rail system in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the controller(s) of FIGS. 1-7. For example, the computer system(s) 800 may be a controller and may control one or more aspects of the contactless direction of sortation shuttles along a track described in FIGS. 1-7.

The computer system(s) 800 may be configured to communicate with one or more servers, user devices, or the like. The computer system(s) 800 may be configured to perform shuttle diagnostics, control electromagnet energization systems, identify shuttles, direct shuttles, move shuttles, determine sensor feedback, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   a set of rails that form a track having a central axis, the set of rails comprising a first rail segment on a first side of the central axis and a second rail segment on a second side of the central axis, wherein the track comprises a linear path and a curved path that intersects the linear path;
   a shuttle configured to transport items from a first location to a second location using the set of rails, the shuttle comprising:
   a first ferrous block;
   a second ferrous block;
   a first set of wheels;
   a first conveyor assembly having a central axis that is transverse to the central axis of the track;
   a first set of electromagnets disposed along the central axis of the track;
   a second set of electromagnets disposed along a side of the linear path, wherein electromagnets of the second set of electromagnets are configured to be individually energized; and
   a third set of electromagnets disposed along a side of the curved path, wherein electromagnets of the third set of electromagnets are configured to be individually energized;
   wherein energizing the third set of electromagnets causes the shuttle to merge onto the curved path via interaction with at least one of the first ferrous block or the second ferrous block,
   one or more heatsinks disposed adjacent to a curved steel plate; and
   one or more active cooling devices disposed adjacent to the curved steel plate.

2. The system of claim 1, wherein the shuttle is configured to move along both the linear path and the curved path, and wherein the track is devoid of mechanical switching components to direct the shuttle along the linear path or the curved path.

3. The system of claim 1, wherein the first set of electromagnets is disposed at a first end of the curved path, the system further comprising:
   a set of permanent magnets disposed adjacent to the first set of electromagnets, the set of permanent magnets disposed at a second end of the curved path.

4. The system of claim 1, further comprising:
   a cover plate disposed on a first side of the first set of electromagnets, the cover plate configured to separate the first set of electromagnets from the shuttle;
   wherein the curved steel plate is disposed on a second side of the first set of electromagnets.

5. A system comprising:
   a track comprising:
   a linear path; and
   a curved path that intersects the linear path;
   a shuttle comprising a first ferrous block and a second ferrous block, the shuttle configured to move along the track;

a first set of electromagnets disposed along a side of the curved path, wherein electromagnets of the first set of electromagnets are configured to be individually energized;

wherein energizing the first set of electromagnets causes the shuttle to merge onto the curved path via interaction with at least one of the first ferrous block or the second ferrous block, one or more heatsinks disposed adjacent to a curved steel plate; and one or more active cooling devices disposed adjacent to the curved steel plate.

6. The system of claim 5, wherein the shuttle is configured to move along both the linear path and the curved path, and wherein the track is devoid of mechanical switching components to direct the shuttle along the linear path or the curved path.

7. The system of claim 5, wherein the first set of electromagnets is disposed at a first end of the curved path, the system further comprising:

a set of permanent magnets disposed adjacent to the first set of electromagnets, the set of permanent magnets disposed at a second end of the curved path.

8. The system of claim 7, wherein the set of permanent magnets is disposed in an alternating polarity arrangement.

9. The system of claim 5, further comprising:

a second set of electromagnets disposed along a side of the linear path, wherein electromagnets of the second set of electromagnets are configured to be individually energized;

wherein energizing the second set of electromagnets causes the shuttle to bypass the curved path via interaction with at least one of the first ferrous block or the second ferrous block.

10. The system of claim 5, further comprising:

a cover plate disposed on a first side of the first set of electromagnets, the cover plate configured to separate the first set of electromagnets from the shuttle; and wherein the curved steel plate is disposed on a second side of the first set of electromagnets.

11. The system of claim 5, wherein electromagnets of the first set of electromagnets are individually energized in a sequential order.

12. The system of claim 11, wherein an individual electromagnet is de-energized after an adjacent electromagnet is energized.

13. The system of claim 5, wherein each electromagnet of the first set of electromagnets is energized at a substantially same time.

14. The system of claim 5, further comprising:

a second set of electromagnets disposed along the track;

wherein the shuttle comprises a permanent magnet, and the shuttle is propelled along the track via interaction between the permanent magnet and the second set of electromagnets.

15. A system comprising:

a track having a linear path and a branched path;

a first set of electromagnets disposed along a first side of the linear path;

a second set of electromagnets disposed along a second side of the branched path;

a shuttle comprising one or more ferrous blocks configured to interact with the first set of electromagnets and the second set of electromagnets;

wherein energizing of the first set of electromagnets causes the shuttle to bypass the branched path, and energizing of the second set of electromagnets causes the shuttle to merge onto the branched path;

one or more heatsinks disposed adjacent to a curved steel plate; and one or more active cooling devices disposed adjacent to the curved steel plate.

16. The system of claim 15, wherein the track is devoid of mechanical switching components to direct the shuttle along the linear path or the branched path.

17. The system of claim 15, further comprising:

a controller configured to:

cause the first set of electromagnets to be energized to guide the shuttle along the linear path; and cause the second set of electromagnets to be energized to guide the shuttle from the linear path to the branched path.

18. The system of claim 15, wherein the shuttle moves in one direction along the track.

19. The system of claim 15, wherein the shuttle further comprises a permanent magnet disposed under the shuttle, and the one or more ferrous blocks comprises a first ferrous block on a first side of the shuttle, and a second ferrous block on a second side of the shuttle.

* * * * *